Patented May 4, 1943

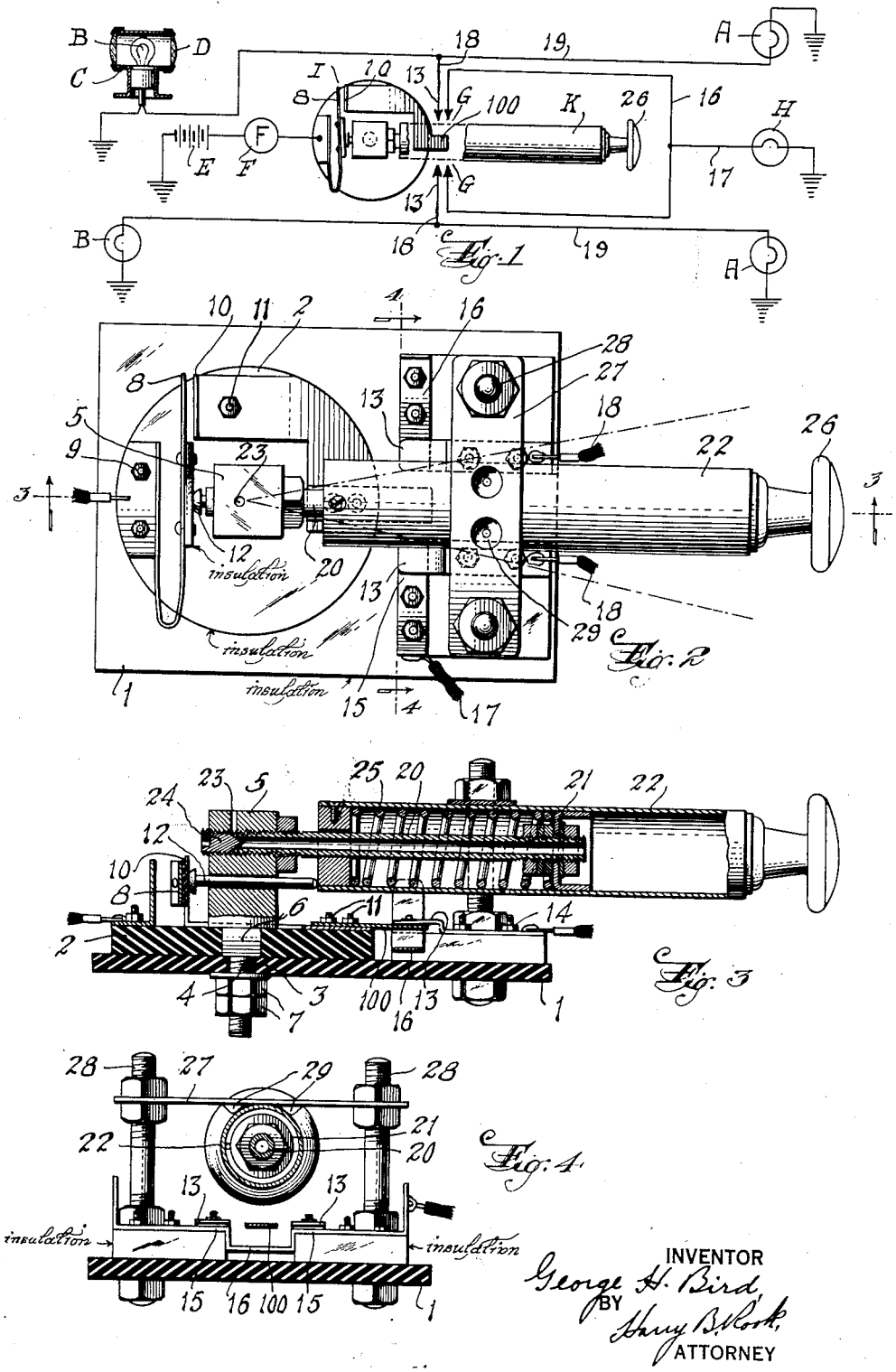

2,318,281

UNITED STATES PATENT OFFICE 2,318,281

VEHICLE SIGNAL AND SWITCH MECHANISM

George H. Bird, Brooklyn, N. Y.

Application May 14, 1940, Serial No. 335,057

3 Claims. (Cl. 200—34)

This application is a continuation in part of my co-pending application Serial No. 282,369 filed July 1, 1939, and the invention relates in general to a signal for vehicles for indicating the driver's intentions to change the direction of travel of the vehicle, which comprises electric means for selectively visually indicating an intended change of direction of travel either to the right or to the left. The signal is normally operated by the hand of the driver of the vehicle, and in order to be satisfactorily effective, i. e., to insure that it shall be observed, it is necessary that the signal be operated for a substantial period of time, for example several seconds, and this requires the continued attention of the operator and the use of his hand for operating the signal throughout the period of operation. To that extent, the attention of the driver is distracted from operation of the vehicle and his ability to control the vehicle is reduced by the employment of at least one hand in operating the signal.

Therefore one prime object of the present invention is to provide a novel and improved electric switch for such a signal, operation of which shall require the attention of the operator only for an instant, and after operation of the signal has been initiated by the driver, the switch shall automatically continue operation of the signal for a predetermined substantial period of time without further attention from the driver.

Further objects are to provide for a vehicle signal system which includes two sets of electric lamps, one set for each side of the vehicle, a switch mechanism that shall include a single manually controlled operator for controlling selectively and individually both sets of lamps, and novel and improved means cooperating with said operator whereby the circuit through either set of lamps can be closed instantaneously by simple movement of the operator with a minimum of attention and effort by the driver of the vehicle, and thereafter the circuit will remain closed for a predetermined time and then automatically opened without further attention by the driver, thus to provide a circuit controller for each set of lamps, a third circuit controller common to both sets of lamps, a single operator for all of said controllers whereby the circuit through either set of lamps can be closed by simple instantaneous movement of the operator, said operator including means cooperating with said third circuit controller so that the circuit will remain closed for a predetermined time and then automatically open without attention by the driver.

A further object is to provide a novel and improved construction and combination of such circuit controllers and operator, which shall be simple, reliable and inexpensive in construction and operation.

Other objects, advantages and results of the invention will appear from the following description in conjunction with the accompanying drawing in which Figure 1 is a wiring diagram of the electrical vehicle system embodying my invention.

Figure 2 is a top plan view of the switch mechanism.

Figure 3 is a vertical longitudinal sectional view on the line 3—3 of Figure 2, and Figure 4 is a transverse vertical sectional view on the line 4—4 of Figure 2.

Specifically describing the illustrated embodiment of the invention, my vehicle signal includes two electric incandescent lamps A and B for each side of the vehicle, one to be arranged for example on the front wheel fender, and the other to be arranged upon the rear wheel fender. Preferably each lamp is mounted in a casing C which has a transparency D at each end so that the casing may be set in such a position on the vehicle that each lamp can be viewed from both the front and rear of the vehicle.

Each set of signal lamps, that is the signal lamps A and B at each side of the vehicle, is controlled by a circuit controller G, there being one such circuit controller for each set of lamps, and a third circuit controller I which is common to both sets of lamps. All of these circuit controllers have a common operator K, which includes means cooperating with each of the circuit controllers; and means connecting the circuit controllers with each other and said sets of lamps is provided so that the circuits through said sets of lamps selectively can be closed instantaneously by manual actuation of said operator, said means in said operator that cooperates with said third circuit controller including automatic mechanism operable upon release of the operator for manual actuation for opening said circuits.

As shown, one terminal of the circuit controller I is connected in series with a known type of flasher F and a source of electricity E, one terminal of which is grounded; and the other terminal of the circuit controller I is adapted to be connected selectively with one terminal of each of the circuit controllers G.

Preferably a pilot lamp H is provided with one terminal connected to each of the circuit controllers G and the other terminal grounded.

Preferably the source of electricity has a voltage of from six to eight volts, each incandescent signal lamp A and B is of a wattage of approximately six watts, while the pilot lamp H is of a wattage of approximately three watts. The sum of the wattage or resistance values of the lamps A and B and pilot lamp H for each side of the vehicle, are so related to the wattage and resistance values of the flasher F, that when either circuit controller G is closed, the flasher F will cause the pilot lamp to be intermittently energized at different rates dependent upon the number of energized signal lamps A and B. Preferably the flasher has a wattage of about fifteen watts. With this construction, when the circuit controller G is closed, normally the pilot lamp H and both signal lamps A and B will be energized, and the flasher will cause the lamps to be energized at a certain rate; in other words, the lamps will be flashed on or off at a given speed. Should one of the signal lamps become inoperative, for example burned out, the pilot lamp H and corresponding other lamp will be energized intermittently or flashed at a higher speed. In this way, it will be possible for the operator to determine whether all of the signal lamps controlled by a given circuit controller G are properly operating. It will be understood that the pilot lamp H and the operator K will be located in some convenient position relative to the driver of the vehicle, for example on the steering post or instrument board.

The switch mechanism itself is shown as comprising a base 1 of suitable insulating material on which is rotatably mounted a disc 2 of insulating material which serves as a support for the circuit controller I. As shown, the base 1 has an opening 3 through which passes the threaded extension 4 of a post 5 that has a polygonal portion 6 fitted in a correspondingly shaped hole in the disc 3, nuts 7 being threaded on the extension 4 for securing the posts on the base.

The circuit controller I includes a spring contact element 8 secured on the disc 2 as by bolts 9 and cooperating with a fixed contact element 10 secured on said disc as by bolts 11. The contact element 8 is normally influenced by its inherent resiliency into contact with the element 10, but such contact is normally prevented by means controlled by the operator. As shown, this means includes a reciprocating rod 12 mounted in the post 5 and actuated by the operator in the direction to move the contact element 8 out of contact with the element 10.

The disc 2 also carries a contact element 100 that may be integral with the contact element 10 and cooperates selectively upon rotation of the disc 2 with the contact elements 13 of the circuit controllers G. These contact elements 13 comprise strips of metal secured on the base 1 as by bolts 14 and each disposed in the path of movement of the contact element 100 as the latter swings upon rotation of the disc 2.

The contact element 100 also is arranged to engage contact portions 15 of a strip 16, one of which is disposed beneath each of the contact strips 13 so that the contact element 12 may simultaneously engage one strip 13 and the corresponding portion 15. The strip 16 is connected by a wire 17 to the pilot lamp H so that said lamp will be energized when the contact element 12 is in contact with either of the contact elements 13. As shown in Figure 1, each contact element 13 is connected by a wire 18 to a wire 19 that is connected to one terminal of each of the lamps A and B of one set.

The operator K for all of the circuit controllers comprises a tube 20 having one end rigidly secured as by threading in the post 5 and the other end carrying a piston 21 arranged within a cylinder 22 that is reciprocable on the tube 20. The tube 20 communicates at one end with the cylinder at one side of the piston 21, while the other end of the tube communicates with the atmosphere through a vent opening 23 in the post 5. A needle valve 24 threaded in the post 5 controls passage through the tube 20 so as to regulate the escape of the air from the cylinder.

The cylinder 22 is actuated in one direction, that is in the present instance toward the post 5, by a compression spring 25, and as the cylinder approaches the limit of its movement in that direction, its end engages the rod 12 to actuate the latter and move and hold the contact element 8 out of contact with the element 10 of the circuit controller I. The free end of the cylinder 22 has a knob 26 for convenience in manipulating the operator, the cylinder and piston thus serving as a handle for the operator to rotate the disc 2.

The parts of the switch are normally in the positions shown in the drawing, and in operation of the switch to energize the lamps for indicating the intended direction of turning of the vehicle, the driver grasps the knob 26, pulls outwardly thereon and simultaneously swings the cylinder about the pivot 4 to bring the contact element 100 into contact with the element 13 of one or the other of the circuit controllers G, depending upon the direction of intended turning. As the cylinder 22 is pulled outwardly, the rod 12 is released and permits the contact element 8 to contact with the element 10 of the circuit controller I, whereby the circuit is closed through one set of lamps A and B, the flasher and the pilot lamp H. Upon manual release of the knob 26, the return of the cylinder 22 to its normal position under influence of the spring 25 is retarded by the air pressure in the cylinder behind the piston, and the circuit will remain closed until the cylinder has returned to the point to engage the rod 12, and push the latter sufficiently to force the contact element 8 out of contact with the contact element 10, whereupon the circuit will be broken and the lamps will be deenergized. Depending upon the setting of the valve 24, the air in the cylinder behind the piston will be permitted to escape rapidly or slowly, which will in turn permit the cylinder to return to its normal position either rapidly or slowly; and of course this in turn will predetermine the period of time during which the contact elements 8 and 10 are in contact to close the circuit.

It will be observed that the driver's attention is required only during the short instant necessary to pull out the cylinder and swing the operator in the proper direction to close the circuit through the proper circuit controller G, the circuit being automatically opened after a predetermined period of time without any attention from the driver.

For convenience in operation, it may be desired to provide means for releasably holding the operator K in neutral position as shown in the drawing. One such means may comprise a resilient strip 27 secured at its ends to the base 1 by posts 28 and overlying the cylinder 22 with a pair of spaced protuberances 29, one arranged at each side of the neutral position of the cylinder. With this construction, the cylinder may slide with a snap action under the protuberances and when located between the protuberances, will be yieldingly held in neutral or inoperative position.

While I have shown and described the invention as embodied in certain details of structure, it should be understood that the construction of the switch and signal may be widely modified and changed by those skilled in the art without departing from the spirit and scope of the invention.

Having thus described my invention, what I claim is:

1. A switch comprising a base, a pair of contact elements mounted on said base in spaced relation, a member rotatably mounted on said base and carrying a contactor to engage and disengage said contact elements selectively upon rotation of said member in opposite directions, a pair of switch contacts mounted on said member one normally influenced toward contact with the other, a pair of relatively reciprocable parts, one fixedly mounted on said rotatable member, and means on said member cooperating with the other of said relatively reciprocable parts and the first-mentioned switch contact for causing contact and disengagement of said first-mentioned switch contact with and from the other switch contact upon relative movement of said relatively reciprocable parts in opposite directions respectively, the second-mentioned of said relatively reciprocable parts constituting a handle for rotating said member and for relatively moving said parts.

2. The switch set forth in claim 1 wherein said relatively reciprocable parts constitute a cylinder and a piston having a tubular piston rod communicating at its extremities respectively with the atmosphere and one end of said cylinder behind the piston, and a valve for controlling the passage through said tubular piston rod to regulate the escape of air from said end of the cylinder.

3. An electrical switch comprising a pair of contact elements normally influenced to contact with each other, a cylinder and a piston relatively reciprocable, said piston having a rod provided with a passage to establish communication between the atmosphere and said cylinder at one side of said piston, a spring for normally relatively moving said piston and cylinder in one direction, means actuated by one of said piston and cylinder to move and hold one of said contact elements out of contact with the other at one point in the relative movement of said piston and cylinder in said direction and to release the first-mentioned contact element for contact with the other contact element upon relative movement of said piston and cylinder in the other direction, and a valve controlling said passage in the piston rod to vary the flow of air through said passage between the atmosphere and said cylinder upon relative movement of said piston and cylinder in the first-mentioned direction under influence of said spring.

GEORGE H. BIRD.